United States Patent
Bharti et al.

(10) Patent No.: US 10,564,420 B2
(45) Date of Patent: Feb. 18, 2020

(54) MIDAIR INTERACTION WITH ELECTRONIC PEN PROJECTION COMPUTING SYSTEM

(71) Applicant: International Business Machines Corporation, Armonk, NY (US)

(72) Inventors: Harish Bharti, Pune (IN); Abhay Kumar Patra, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/722,096

(22) Filed: Oct. 2, 2017

(65) Prior Publication Data
US 2019/0101754 A1 Apr. 4, 2019

(51) Int. Cl.
*G06F 3/033* (2013.01)
*G02B 27/01* (2006.01)
(Continued)

(52) U.S. Cl.
CPC ........... *G02B 27/017* (2013.01); *G06F 1/163* (2013.01); *G06F 1/1673* (2013.01); *G06F 3/011* (2013.01); *G06F 3/017* (2013.01); *G06F 3/0304* (2013.01); *G02B 2027/014* (2013.01); *G02B 2027/0138* (2013.01)

(58) Field of Classification Search
USPC ....... 345/173, 174, 177, 179, 158, 473, 175, 345/633, 156, 419, 8, 589, 653
See application file for complete search history.

(56) References Cited

U.S. PATENT DOCUMENTS

| 8,228,315 B1 | 7/2012 | Starner et al. |
| 2007/0176909 A1 | 8/2007 | Pavlowski |

(Continued)

FOREIGN PATENT DOCUMENTS

CN 202649936 1/2013

OTHER PUBLICATIONS

How to stabilize shaky video footage in After Effects | Adobe After Effects CC tutorials; Adjust for shaky camerawork; Jun. 18, 2014 (source: Ad obe After EffectsCC Classroom in a Book(Ad obe Press)); https://helpx.adobe.com/after-effects/how-to/stabilize-footage.html; printed Sep. 27, 2017; 6 pages.

(Continued)

*Primary Examiner* — Thuy N Pardo
(74) *Attorney, Agent, or Firm* — Aaron N. Pontikos

(57) ABSTRACT

A system and method that allows an electronic pen to interact with projected content in midair without the need for a tangible surface. The pen has a holographic projector that is extendible into a position where it forms a holographic surface and a content projector that is oriented to project content onto the holographic surface formed by the holographic projector. The electronic pen body includes a slot dimensioned to house said holographic projector. The holographic projector can be connected to the pen by a mechanical linkage that locks the holographic projector into position. The electronic pen has sensors for detecting and measuring movement of the pen as well as detecting and measuring user contact with the pen to detect and respond to dynamic movements used to interact with the displayed content.

20 Claims, 7 Drawing Sheets

(51) Int. Cl.
*G06F 1/16* (2006.01)
*G06F 3/01* (2006.01)
*G06F 3/03* (2006.01)

(56) References Cited

U.S. PATENT DOCUMENTS

| | | | |
|---|---|---|---|
| 2007/0182725 A1 | 8/2007 | Pittel | |
| 2007/0188475 A1* | 8/2007 | Tamura | G06F 3/03545 345/177 |
| 2010/0103178 A1* | 4/2010 | Song | G06F 3/03542 345/473 |
| 2012/0249489 A1 | 10/2012 | Onodera et al. | |
| 2013/0016070 A1 | 1/2013 | Starner et al. | |
| 2013/0147711 A1* | 6/2013 | Njolstad | G06F 3/011 345/158 |
| 2013/0169596 A1* | 7/2013 | Wang | G06F 3/0425 345/175 |
| 2014/0009416 A1* | 1/2014 | Son | G06F 3/0416 345/173 |
| 2014/0028635 A1* | 1/2014 | Krah | G06F 3/041 345/179 |
| 2014/0192084 A1* | 7/2014 | Latta | G06F 21/10 345/633 |
| 2014/0253465 A1* | 9/2014 | Hicks | G06F 3/03545 345/173 |
| 2014/0368422 A1* | 12/2014 | Gupta | G06F 3/0304 345/156 |
| 2015/0009155 A1* | 1/2015 | Tsao | G06F 3/03545 345/173 |
| 2015/0195789 A1* | 7/2015 | Yoon | G06F 3/0488 345/173 |
| 2015/0234518 A1* | 8/2015 | Teller | G06F 3/0414 345/173 |
| 2015/0254905 A1* | 9/2015 | Ramsby | G06T 19/006 345/419 |
| 2016/0025971 A1* | 1/2016 | Crow | G02B 27/0093 345/156 |
| 2016/0027215 A1* | 1/2016 | Burns | G02B 27/0172 345/419 |
| 2016/0054819 A1* | 2/2016 | Avanzi | G06F 3/03545 345/179 |
| 2016/0063762 A1* | 3/2016 | Heuvel | G06F 3/011 345/633 |
| 2016/0070371 A1* | 3/2016 | Oonishi | G06F 3/044 345/174 |
| 2016/0109953 A1 | 4/2016 | Desh | |
| 2016/0124527 A1* | 5/2016 | Smutek | G06F 3/03542 345/175 |
| 2016/0139732 A1* | 5/2016 | Takeda | G06F 3/044 345/174 |
| 2016/0165221 A1* | 6/2016 | Duffy | G09G 3/36 345/419 |
| 2016/0253842 A1* | 9/2016 | Shapira | G02B 27/017 345/633 |
| 2016/0379409 A1* | 12/2016 | Gavriliuc | G06T 19/006 345/8 |
| 2016/0379418 A1* | 12/2016 | Osborn | G06T 19/20 345/589 |

OTHER PUBLICATIONS

Edwards, Luke; Apple iPen patents suggest projector, camera, laser and recorder modules; Pocket-lint; Feb. 5, 2014; http://www.pocket-lint.com/news/127046-apple-ipen-patents-suggest-projector-camera-laser-and-recorder-modules; printed Sep. 29, 2017; 4 pages.
Time & Location Based Advertising; Taxi Top LED Advertising Screens; http://www.enrouteviewmedia.com/; copyright 2013 EnRouteViewMedia Inc.; printed May 1, 2017; 6 pages.
Lightwave International; Lightwave International is a Leading Provider of FogScreens; http://www.lasershows.net/fogscreens; copyright Lightwave International; printed Sep. 29, 2017; 2 pages.
FogscreenProjectionScreenReplica—FreefloatingImages!:7Steps (with Pictures); by thedudedrummer (/member/thedudedrummer/) in halloween (/home/halloween/); https://www.instructables.com/id/Fogscreen-Projection-Screen-Replica-Freefloating-i/; copyright 2017 Autodesk, Inc.; printed Sep. 29, 2017; 24 pages.
Pencil Grasp Patterns; The Dynamic Tripod Grasp; OTPlan; copyright 2007-2017 OTPlan provided by Tumble N' Dots, Inc.; http://www.otplan.com/articles/pencil-grasp-patterns.aspx; printed Sep. 29, 2017; 5 pages.
Simon, Mid-Air Haptic Holograms Create 'Invisible' Interactive 3D Objects; 3D printer and 3D printing news; Dec. 10, 2014; copyright 2011-2017. www.3Ders.org; Posted in 3D Software; http://www.3ders.org/articles/20141210-mid-air-haptic-holograms-create-invisible-interactive-3d-objects.html; printed Sep. 29, 2017; 9 pages.
Song, Hyunyoung, et al.; Grips and Gestures on a Multi-Touch Pen; CHI 2011, May 7-12, 2011, Vancouver, BC, Canada. Copyright 2011 ACM 978-1-4503-0267-8-8/11/05; 10 pages.
How to Stabilize Shaky Video; Download Movavi Video Stabilizer; copyright 2017 Movavi; https://www.movavi.com/support/how-to/how-to-stabilize-video.html; printed Sep. 29, 2017; 4 pages.
Lowensohn, Josh; This tiny projector puts smartphone apps on your car's windshield; Navdy's $299 box is gunning for Apple's Car Play and Google's Android Auto; The Verge; https://www.theverge.com/2014/8/5/5970705/this-tiny-projector-puts-smartphone-apps-on-your-cars-windshield; printed on Sep. 29, 2017; 10 pages.
Wikipedia, the free encyclopedia; Image stabilization (IS); Retrieved from "https://en.wikipedia.org/w/index.php?title=Image_stabilization&oldid=797064797"; printed Sep. 29, 2017; 6 pages.

* cited by examiner

MIDAIR INTERACTION WITH ELECTRONIC PEN PROJECTION COMPUTING SYSTEM

BACKGROUND

The present invention relates to electronic pens and, more specifically, to a system and method for interacting with an electronic pen without a physical surface.

Digital pens and styli are popular input devices for computing devices for tasks such as annotating and drawing as the devices leverage the fine precision of a pen along with the dexterity of the user. Digital pens can also be used for common interface tasks such as mode switching and scrolling. The next generation of electronic pens will also be able to project computing content onto a physical surface and then allow the user to interact with the projected content as a new approach for interacting with a smart device, such as a tablet computer or smart phone. In some instances, however, an acceptable physical surface onto which the computing content may be projected may not be available to the user. Accordingly, there is a need in the art for an approach of interacting with an electronic pen that does not require a physical surface onto which the computing content may be projected.

SUMMARY

The present invention provides a system and method for allowing an electronic pen to interact with projected content in midair and without the need for a tangible surface. The electronic pen comprises an elongated body extending from a front end and terminating at a rear end, a holographic projector interconnected to the pen and configured to form a holographic surface in a location in front of and spaced apart from the pen, and a content projector positioned proximately to the front end of the pen and oriented to project content onto the holographic surface formed by the holographic projector. The electronic pen body includes a slot dimensioned to house the holographic projector. The holographic projector is interconnected to the body by a mechanical linkage. The linkage is moveable between a first position, where the holographic projector is stored in the slot of the body and a second position, where the holographic projector is extended into a position where the holographic projector form the holographic surface in the location in front of and spaced apart from the pen. The mechanical linkage is configured to lock the holographic projector into the position where the holographic projector form the holographic surface in the location in front of and spaced apart from the pen. The electronic pen may also include a first sensor for detecting and measuring movement of the pen. The electronic pen may also include a second sensor for detecting and measuring user contact with the pen. User contact detected by the second is distinguished into static contact and dynamic contact, and the dynamic content is used to interact with the displayed content. The holographic projector can generate the holographic surface using fog or acoustic waves.

The method of interacting with a smart device involves providing an electronic pen having an elongated body extending from a front end and terminating at a rear end, a holographic projector interconnected to the pen, and a content projector positioned proximately to the front end of the pen, using the holographic projector to form a holographic surface in a location in front of and spaced apart from the pen, and using the content projector to project content onto the holographic surface formed by the holographic projector. The method further includes positioning the holographic projector interconnected to the pen in a location where the holographic projector can form the holographic surface in front of and spaced apart from the pen. Positioning the holographic projector interconnected to the pen in the location involves removing the holographic projector from a stored position in a slot in the body of the pen, extending the holographic projector from the pen using a mechanical linkage interconnecting the holographic projector to the body, and locking the mechanical linkage when the holographic projector is in the location. The method may further include using at least a first sensor to detect and measure movement of the pen. The method may further include using at least a second sensor for detecting and measuring user contact with the pen. The method may further include using at least a second sensor for detecting and measuring user contact with the pen comprises distinguished user contact into static contact and dynamic contact, where the dynamic content is used to interact with the displayed content.

DETAILED DESCRIPTION

Figure 1:
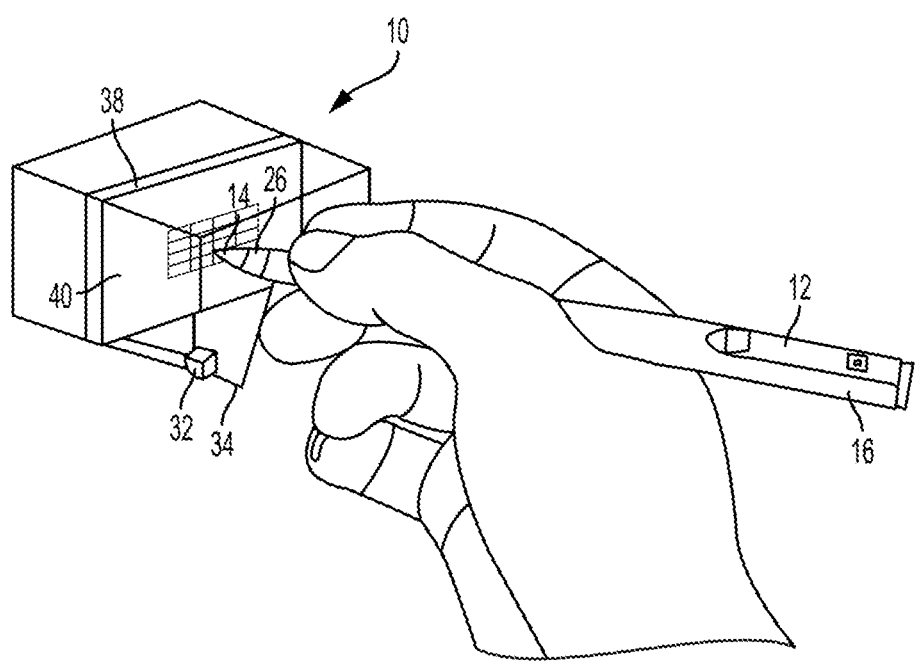
FIG. 1 is a schematic of an electronic pen system having an extended holographic projector and an internal content projector for displaying and interacting with electronic content in midair.
Figure 2:
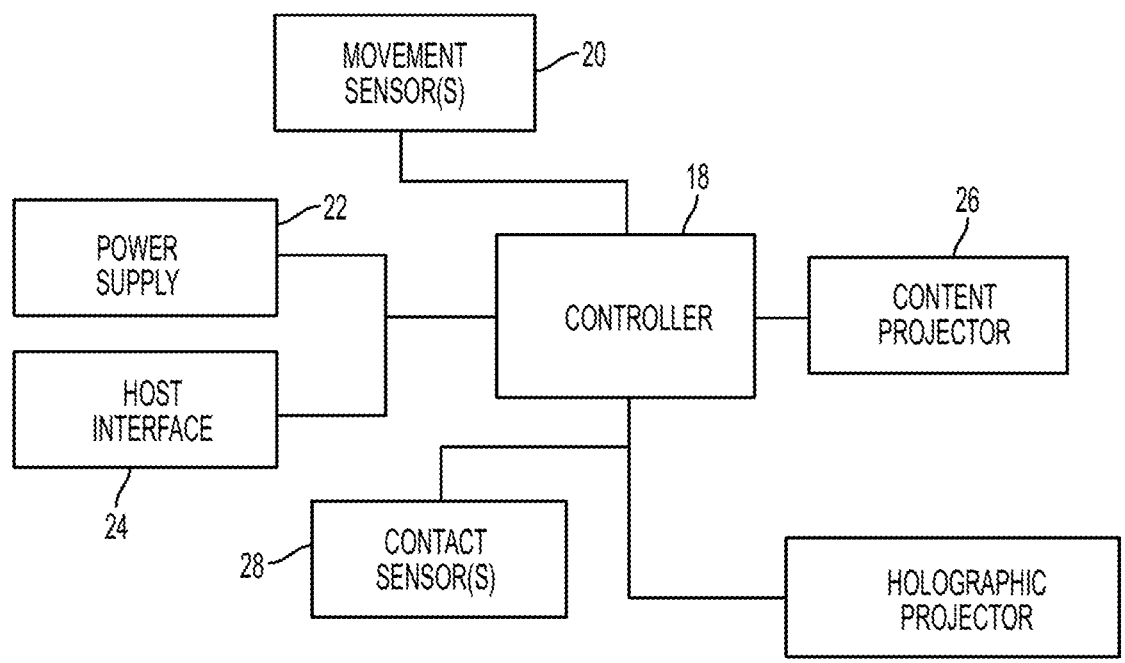
FIG. 2 is a schematic of the electronic components and circuitry for an electronic pen system having a holographic projector and content projector.

Referring to the figures, wherein like numerals refer to like parts throughout, there is seen in FIG. 1 an electronic pen system 10 having a body 12 that extends from a front end 14 to a rear end 16. Body 12 is dimensioned to be held in the hand of a user and may be paired with a remotely position smart device, such as a smart phone or tablet, using conventional pairing approaches as is known in the art. Referring to FIG. 2, body 12 thus includes circuitry for communicating with the smart device, such as a programmable controller 18 as well as movement sensors 20, such as accelerometers, for tracking movement of the pen 10 when held by a user. Body 12 may further include a power supply 22 (whether on board or connected to external power) and a host interface 24 for communicating with a remote host, such as smart phone, tablet etc. using established communication protocols, e.g., Bluetooth® or the like.

Front end 14 of body 12 includes a content projector 26 for projecting computing content onto a surface. The computing content projected by content projector 26 is provided from the remotely positioned smart device to pen 10 via host interface 24 so that the user can view computing content projected onto a surface positioned in front of front end 14 by content projector 26. Pen 10 is further configured to track movements of pen 10 so that the user can interact with the projected content. User may therefore move pen 10 to provide manual inputs relative to an image of a keyboard project by content projector 26, scroll around documents project by content projector 26, select icons projected by content projector 26, etc. Content projector 26 preferably comprises a pico-projector array positioned circumferentially around front end 14 of pen 10. Pico-projectors generally include a power source (which can be derived from pen 10), control electronics, one or more laser or LED light sources, combiner optics and/or scanning mirrors. The control electronics convert image date, such as that received from remote smart device, into electronic signals that drive the lasers or LED light sources to reproduce the image in different colors and intensities. The combiner optics combined the reproduced image into a single image having the various colors that is projected form the pico-projector.

Figure 3:
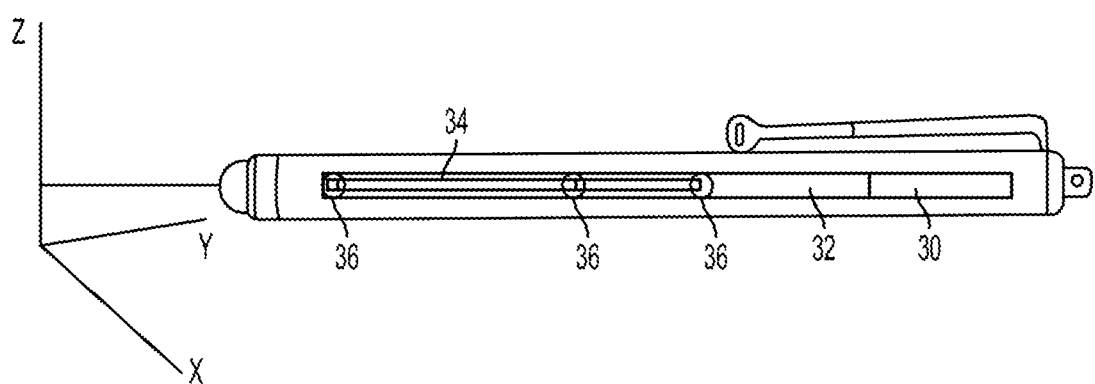
FIG. 3 is a schematic of an electronic pen system having a stowed holographic projector and a content projector.

Content projector 26 is preferably driven from software on the paired computing device that reduces shaking of the projected content based on historical movement patterns of the fingers of the user along with conventional anti-shaking algorithms such as those used in connection with digital cameras and imagers to adjust the displayed content so that the displayed content appears steady. The storing of historical writing patterns and hand movements may be accomplished by using a contact sensor 28 to identify the gripping style, applied force, and stability of pen 10 during use, and to track the use of pen 10 by an individual over time relative to a predetermined three-dimensional coordinate geometry (such as a X, Y, Z coordinate system) as seen in FIG. 3. For example, if contact sensor 28 is a multi-touch sensor such as a capacitive multi-touch sensor formed by a flexible matrix of capacitive-sensing electrodes wrapped around body 12 of pen 10, it is possible to distinguish different hand grips using contact data from fingers resting on the multi-touch sensor. It is also possible to detect finger-based touch gestures such as horizontal or vertical swipes and double taps with the thumb or index finger. The flexible matrix of capacitive-sensing electrodes may comprise a 20×10 grid of sensing elements printed on a flexible substrate using conductive ink. The raw capacitive sensor values are reported as 20×10 pixel grayscale images at a predetermined sampling rate, such as 100 Hz, and may then be processed to extract and track individual touch contacts. The processing involves distinguishing between two types of contacts, i.e., static and dynamic, based on their temporal characteristics. Static contacts do not exhibit much movement and mostly remain of constant size and location and may thus be mapped to the parts of the hand the support the pen, i.e., the thumb, middle finger and web of the thumb. For example, the grip style can include the tripod grasp with open web space where pen 10 is held with the tip of the thumb and index finger and rests against the side of the third finger and the thumb and index finger form a circle. The grip style can also include a quadripod grasp with open web space where pen 10 is held with the tip of the thumb, index finger, and third finger and rests against the side of the fourth finger and the thumb and index finger form a circle. The grip style can also include an adaptive tripod or D'Nealian grasp where pen 10 is held between the index and third fingers with the tips of the thumb and index finger on the pencil, and pen 10 rests against the side of the third finger near its end. Dynamic contacts are typified by more movement and correspond to finger movements that are associated with functional inputs such as gesturing, activating a button, etc. The two types of contacts can be identified using detection algorithms that record a baseline amount of activity and then set a threshold for future contact identification. Contacts determined to indicate dynamic events may then be mapped to predetermined functions such as pressing a button, scrolling a pointer, etc. A similar approach may be used to identify movement of pen 10 that are intended to result in functionality. For example, gesture recognition algorithms may be used to determine when movement sensors 20 that detect motion have acquired movement data representative of functional movements, such as double tapping or swiping across a field of view. It should be recognized that there are a wide variety of contact and gesture of pen 10 that can be mapped to common computer interface inputs and the availability of any particular contact and gesture, or set of contacts and gestures can be predefined or configurable by a user of pen 10. Training routines may also be developed to allow users to practice with pen 10 and learn the specific set of contacts and gestures that are available. As explained below, these contacts and gestures are configured with respect to a predetermined field of view proximate to the front end 14 of pen 10 that may comprise a physical surface, such as a desktop or table, or a virtual surface created by pen 10.

In the event that a physical surface is not available for receiving the projection from content projector 26, body 12 of electronic pen system 10 further includes a slot 30 for releasably accepting a holographic projector 32 therein. Holographic projector 32 is coupled to pen 10 via a mechanical linkage 34 having hinges 36 that allow holographic projector 32 to be removed from housing 12 and extended (and preferably locked) into an operative position by linkage 34 so that holographic projector 32 is proximate to but spaced apart from front end 14 of pen 10 a predetermined distance determined to be optimal based on the characteristics of holographic projector 32. Hinges 36 preferable lock into position to hold holographic projector 32 in a fixed position relative to pen 10.

Figure 4:
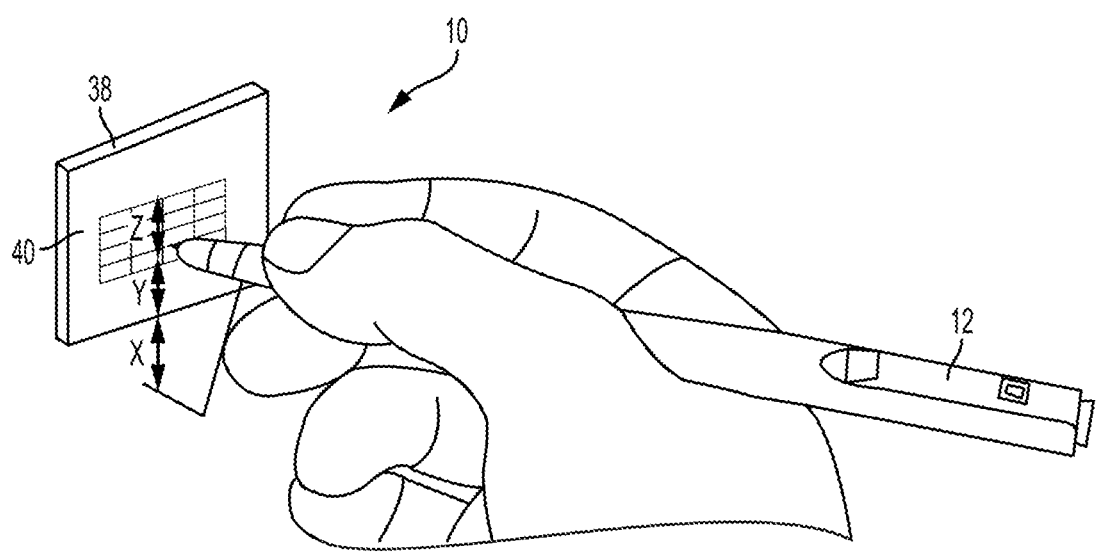
FIG. 4 is a further schematic of an electronic pen system that is programmed for interacting with projected content.

As seen in FIG. 1, when extended into the operative position, holographic projector 32 is configured to create a holographic surface onto which content projector 26 can project computing content 40. When extended, holographic projector 32 thus creates a virtual surface in the space in front of content projector 20 so that a physical surface, such as a table or desk, is not required for the use of pen 10. A user of pen 10 may thus project content onto the holographic surface created by holographic projector 32 in the air, instead of a tangible surface, thereby allowing use of pen 10 is virtually any circumstances. As holographic projector 32 moves with pen 10, the projected holographic surface may need to be attenuated as pen 10 is moved. For example, as seen in FIG. 3, movement of pen 10 would mostly be limited to distance Z/2 as measured from the center of the projected surface. If pen 10 is lifted vertically by Z/2, holographic projector would move up by Z/2 thereby requiring that distance X be reduced by Z/2 (bringing projected surface closer to pen 10 by a vertical distance of Z/2). Content projector 26 will also need to adjust the size and positing of projected content. In the example of FIG. 4, X>Z/2 when the position of pen 10 is assumed at the center of projected surface and Y>Z/2 when the position of pen 10 is assumed in center of the projected screen. Comparable calculations and resulting adjustments may be made for movement of pen 10 in other directions. It addition to changing the display of the content relative to movement of the pen 10, there will also be instances where the user is simply moving pen 10 and intends for the displayed content to remain static relative to pen 10, i.e., the displayed content should remain still relative to pen 10 and move along with movements of pen 10, such as when a user repositions or moves from one location to another. Pen 10 may thus include the ability to toggle between two registration modes—one for moving pen 10 around displayed content and a second for moving content along with movement of pen 10.

Holographic projector 32 may comprise a dry fog generator configured to dispel a thin suspended layer of dry fog that enables vivid projection of images by content projector 26. Holographic projector 32 may also comprise ultrasound systems that are capable of degenerating three-dimensional shapes in midair by focusing acoustic radiation forces onto a specific region to field disturbances caused by the sound waves. For use with pen 10, holographic projector 32 can be simplified to only project a planar surface onto which content projector 20 can project the computing content. While some projection content will pass through the holographic surface formed by holographic projector, holographic surface density and the brightness of content projector 26 can be attenuated to form a viewable image.

Figure 5:
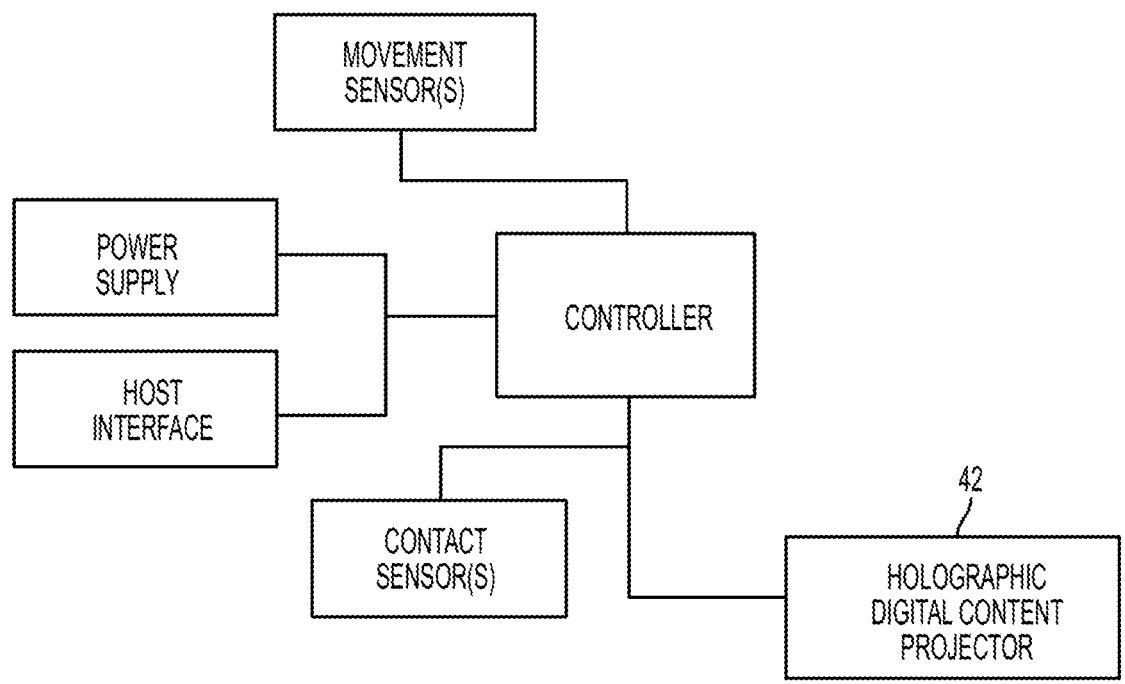
FIG. 5 is a schematic of the electronic components and circuitry for an electronic pen system having a holographic digital content projector.

As seen in FIG. 5, electronic pen system 10 may include a holographic digital content projector 42 in lieu of holographic projector 32. This option allows for the omission of digital content projector 26 as holographic digital content projector 42 is able to generate three-dimensional content in midair. For example, holographic digital content projector 42 may comprise a multiple color laser array that that uses beams of light projected from holographic digital content projector 42 to generate plasma excitation in atoms of oxygen and nitrogen in the air above holographic digital content projector 42 after being extended from housing 12 as discussed above. Such laser arrays are currently able to create 50,000 points of light per second, which equates to a video frame rate of 10-15 fps and thus, while slightly below full video frame rates at the present time, can nevertheless display static or dynamic content in midair.

Figure 6:
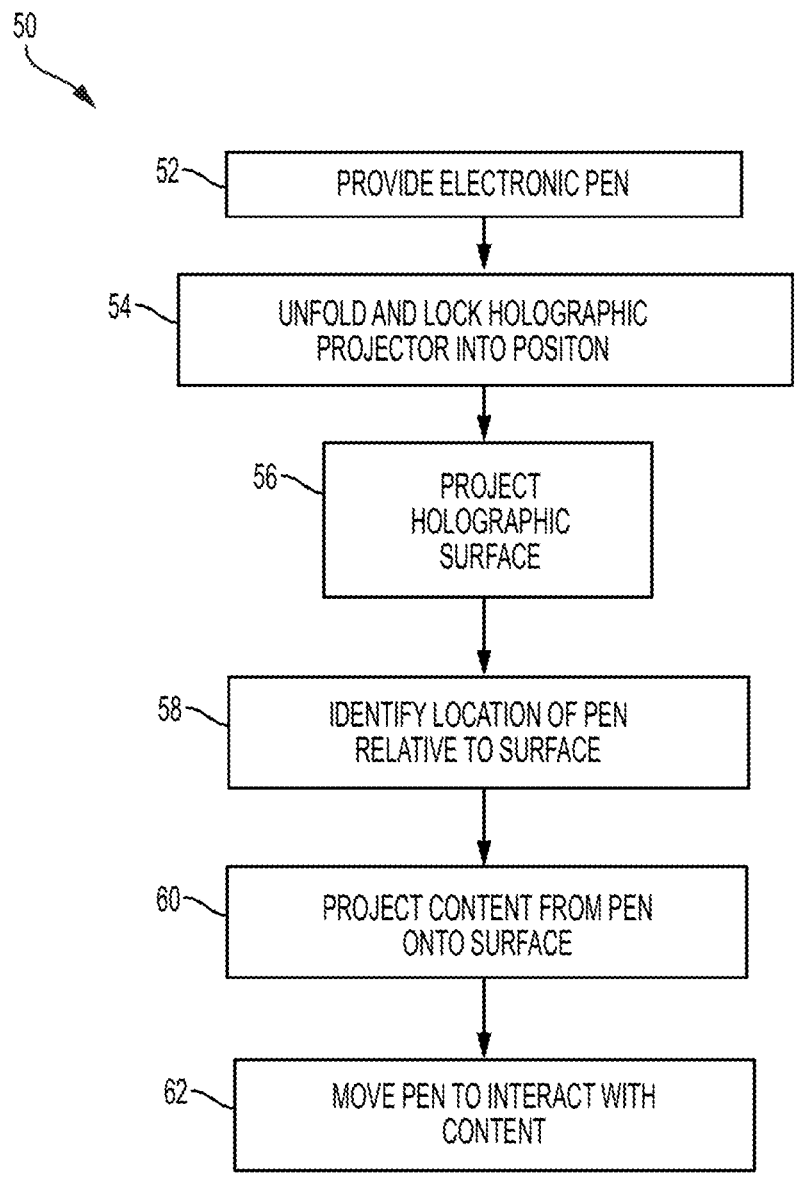
FIG. 6 is a flowchart of a first method of using an electronic pen system to interact with electronic content in midair.

Referring to FIG. 6, a method of interacting with projected content 50 begins with providing an electronic pen 52 having the equipment discussed above. More specifically, pen 10 will include slot 30 containing holographic projector 32 connected to pen 10 by mechanical linkage 34. Next, holographic projector 32 is unfolded and locked into position 54. Once locked into position, holographic projector 32 projects a holographic surface 56 in front of pen 10. Once holographic projector 32 is ready, pen 10 can determine its position 58 relative to the holographic surface projected by holographic projector 32. For example, software running a device paired with pen 10 will identify the location of pen 10 relative to surface and define a three-dimensional space representing the potential range of motion of pen 10. Pen 10 can then project content 60 by using content projector 26 onto the holographic surface formed by holographic projector 32. Any anti-shaking algorithms associated with pen 10 can minimize anomalous movements and adjust the projected holographic surface and projected content accordingly. Finally, user can move pen 10 to interact with content projected onto the holographic surface 62.

Figure 7:
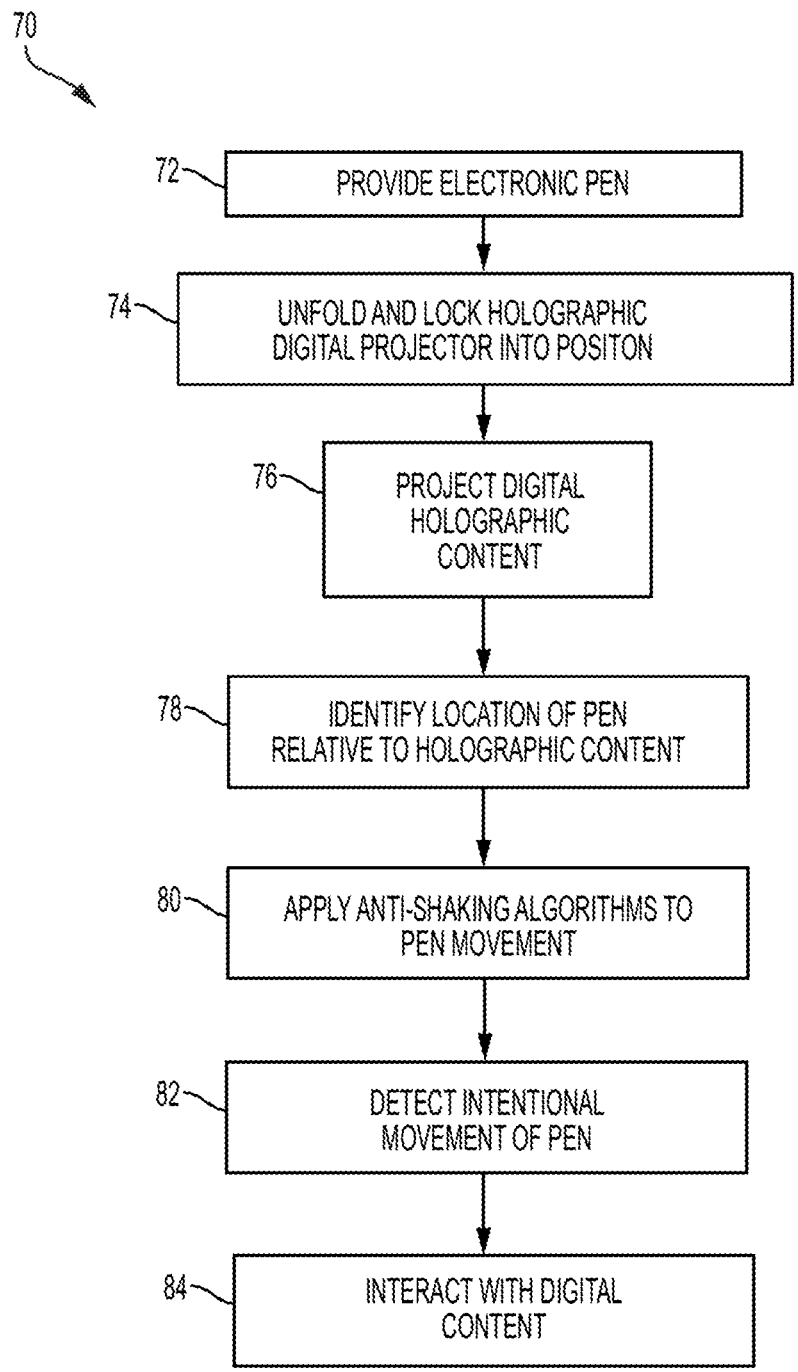
FIG. 7 is a flowchart of a second method of using an electronic pen system to interact with electronic content in midair.

Referring to FIG. 7, another method of interacting with projected content 70 begins with providing an electronic pen 72 having the equipment discussed above. More specifically, pen 10 will include slot 30 containing holographic digital content projector 42 connected to pen 10 by mechanical linkage 34. Next, holographic digital content projector 42 is unfolded and locked into position 74. Once locked into position, holographic digital content projector 42 projects a holographic digital content 76 in front of pen 10. Next, pen 10 determines its position 78 relative to the holographic surface projected by holographic projector 32. For example, software running a device paired with pen 10 will identify the location of pen 10 relative to surface and define a three-dimensional space representing the potential range of motion of pen 10. Anti-shaking algorithms 80 are then applied and any intentional movement of pen 10 is detected 82. The detected intentional movements are then used to allow user to interact with the projected digital content 84.

The descriptions of the various embodiments of the present invention have been presented for the purposes of illustration, but are not intended to be exhaustive or limited to the embodiments disclosed. Many modification and variations will be apparent to those of ordinary skill in the art without departing from the scope and spirit of the described embodiments. The terminology used herein was chosen to best explain the principles of the embodiments, the practical application or technical improvement over the technologies found in the market place, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An electronic pen, comprising:
   an elongated body extending from a front end and terminating at a rear end;
   a holographic digital content projector interconnected to said elongated body and configured to display holographic digital content in a location in front of and spaced apart from said elongated body; and
   a controller programmed to detect movement of said elongated body in three dimensions relative to said holographic digital content and to adjust said displayed holographic digital content to account for movement of the elongated body in three dimensions relative to the holographic digital content and any shaking of said elongated body.

2. The electronic pen of claim 1, wherein said body includes a slot dimensioned to house said holographic projector.

3. The electronic pen of claim 2, wherein said holographic projector is interconnected to said body by a mechanical linkage.

4. The electronic pen of claim 3, wherein said mechanical linkage is moveable between a first position, where said holographic digital content projector is stored in said slot of said body and a second position, where said holographic digital content projector is extended into a position where said holographic digital content projector form said displayed digital content in said location in front of and spaced apart from said body.

5. The electronic pen of claim 4, wherein said mechanical linkage is configured to lock said holographic digital content projector into said position where said holographic digital content projector forms said displayed digital content in said location in front of and spaced apart from said body.

6. The electronic pen of claim 5, further comprising at least a first sensor for detecting and measuring movement of said body.

7. The electronic pen of claim 6, further comprising at least a second sensor for detecting and measuring user contact with said body.

8. The electronic pen of claim 7, wherein user contact detected by said second is distinguished into static contact and dynamic contact.

9. The electronic pen of claim 8, wherein said dynamic contact is used to interact with said displayed digital content.

10. The electronic pen of claim 9, wherein movement of said body is used to interact with said displayed digital content.

11. A method of interacting with a smart device, comprising:

providing an electronic pen having an elongated body extending from a front end and terminating at a rear end, a holographic digital content projector interconnected to said pen;

using said holographic digital content projector to display holographic digital content in a location in front of and spaced apart from said elongated body; and adjusting for movement of the elongated body in three dimensions relative to the digital content and any shaking of said elongated body relative to said holographic digital content.

12. The method of claim 11, further comprising positioning said holographic digital content projector interconnected to said body in a predetermined location where said holographic digital content projector can form said displayed holographic digital content in front of and spaced apart from said body.

13. The method of claim 12, wherein positioning said holographic digital content projector interconnected to said pen in said predetermined location comprises removing said holographic digital content projector from a stored position in a slot in said body of said pen, extending said holographic digital content projector from said pen using a mechanical linkage interconnecting said holographic digital content project to said body, and locking said mechanical linkage when said holographic digital content projector is in said location.

14. The method of claim 13, further comprising using at least a first sensor to detect and measure movement of said body.

15. The method of claim 14, further comprising using at least a second sensor for detecting and measuring user contact with said body.

16. The method of claim 15, wherein using at least a second sensor for detecting and measuring user contact with said pen comprises distinguishing user contact into static contact and dynamic contact.

17. The method of claim 16, further comprising the step of using said dynamic contact to interact with the displayed holographic digital content.

18. The method of claim 17, further comprising the step of using movement of said body to interact with said displayed holographic digital content.

19. The method of claim 18, wherein said holographic digital content projector generates said displayed holographic digital content using a laser array.

20. The method of claim 19, wherein said displayed holographic digital content includes static and dynamic content.

\* \* \* \* \*